United States Patent
Lee et al.

(10) Patent No.: US 9,210,660 B2
(45) Date of Patent: Dec. 8, 2015

(54) METHOD AND DEVICE FOR TRANSCEIVING DATA IN A RADIO ACCESS SYSTEM SUPPORTING MULTI-RADIO ACCESS TECHNOLOGY

(75) Inventors: Eunjong Lee, Anyang-si (KR); Kiseon Ryu, Anyang-si (KR); Youngsoo Yuk, Anyang-si (KR); Heejeong Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 13/978,815

(22) PCT Filed: Dec. 26, 2011

(86) PCT No.: PCT/KR2011/010092
§ 371 (c)(1),
(2), (4) Date: Jul. 9, 2013

(87) PCT Pub. No.: WO2012/096457
PCT Pub. Date: Jul. 19, 2012

(65) Prior Publication Data
US 2013/0294314 A1    Nov. 7, 2013

Related U.S. Application Data

(60) Provisional application No. 61/431,394, filed on Jan. 10, 2011.

(51) Int. Cl.
*H04W 52/02* (2009.01)
*H04W 48/18* (2009.01)
*H04W 76/02* (2009.01)
*H04W 88/06* (2009.01)
(Continued)

(52) U.S. Cl.
CPC .......... *H04W 52/0225* (2013.01); *H04W 48/18* (2013.01); *H04W 76/025* (2013.01); *H04W 36/14* (2013.01); *H04W 76/064* (2013.01); *H04W 88/06* (2013.01); *Y02B 60/50* (2013.01)

(58) Field of Classification Search
None
See application file for complete search history.

(56) References Cited

U.S. PATENT DOCUMENTS 8,380,193 B2 * 2/2013 Chen et al. ................ 455/435.2
2008/0076430 A1 * 3/2008 Olson ......................... 455/440
(Continued)

OTHER PUBLICATIONS

Feder, et al., "Study Report on Hierarchical Networks: Revision to Subclause 5," IEEE 802.16 Broadband Wireless Access Working Group, IEEE 802.16ppc-10/0073, Jan. 2011, 4 pages.
(Continued)

*Primary Examiner* — Noel Beharry
*Assistant Examiner* — Ning Li
(74) *Attorney, Agent, or Firm* — Lee, Hong, Degerman, Kang & Waimey

(57) ABSTRACT

In the specification, a method for a terminal to transceive data to/from a first base station supporting a first RAT and a second base station supporting a second RAT in a radio access system supporting multi-Radio Access Technology (RAT) includes: performing a data communication on a first service flow with the first base station; receiving a first message, which instructs an access of the terminal by the second base station, from the first base station in order for the terminal to perform a data communication on a second service flow with the second base station; performing a procedure of accessing the second base station; and performing a data communication on the second service flow with the second base station according to the run-time information.

12 Claims, 12 Drawing Sheets

(51) Int. Cl.
*H04W 36/14* (2009.01)
*H04W 76/06* (2009.01)

(56) References Cited

U.S. PATENT DOCUMENTS

| | | |
|---|---|---|
| 2008/0205345 A1* | 8/2008 | Sachs et al. .................. 370/332 |
| 2008/0212542 A1* | 9/2008 | Kung et al. .................. 370/336 |
| 2009/0117891 A1* | 5/2009 | Chou .......................... 455/423 |
| 2010/0067434 A1 | 3/2010 | Siu et al. |
| 2011/0002302 A1* | 1/2011 | Ding et al. .................. 370/331 |
| 2011/0047592 A1* | 2/2011 | Feder et al. .................. 726/1 |
| 2011/0176511 A1* | 7/2011 | Sayeedi ...................... 370/331 |
| 2011/0216741 A1* | 9/2011 | Yang et al. .................. 370/331 |
| 2012/0087338 A1* | 4/2012 | Brandt et al. ................ 370/331 |

OTHER PUBLICATIONS

Yuk, et al., "Coordinated AP for tightly coupled BS-AP interworking for Multi-RAT devices," IEEE 802.16 Broadband Wireless Access Working Group, IEEE 802.16ppc-10/0078, Jan. 2011, 10 pages.

* cited by examiner

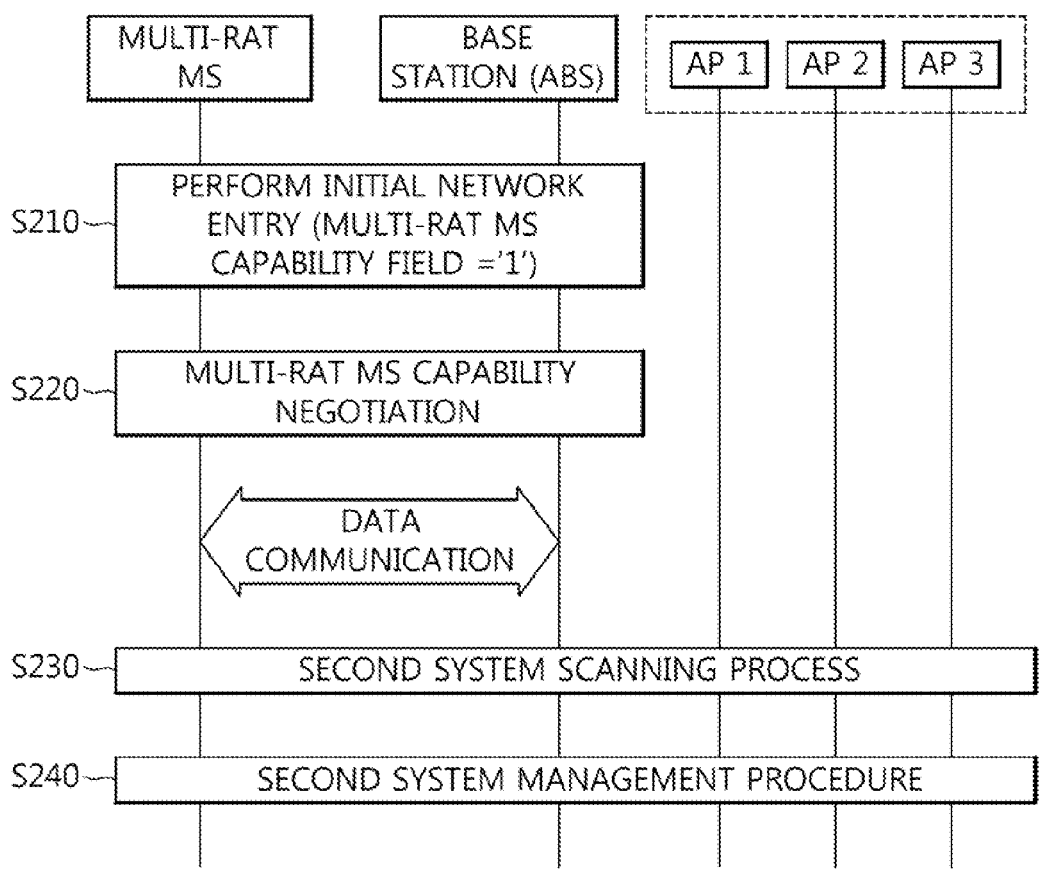

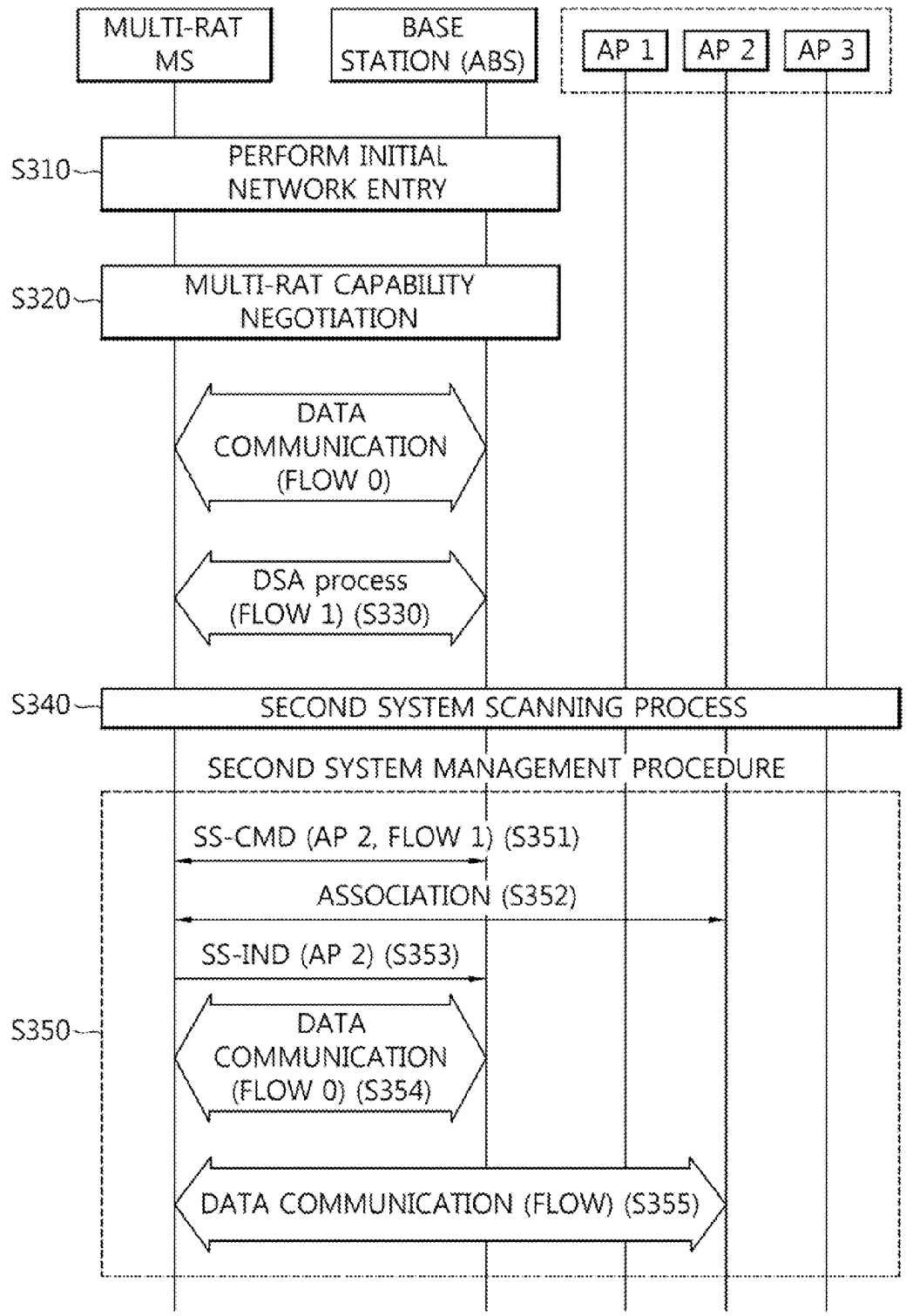

METHOD AND DEVICE FOR TRANSCEIVING DATA IN A RADIO ACCESS SYSTEM SUPPORTING MULTI-RADIO ACCESS TECHNOLOGY

CROSS-REFERENCE TO RELATED APPLICATIONS

This application is the National Stage filing under 35 U.S.C. 371 of International Application No. PCT/KR2011/010092, filed on Dec. 26, 2011, which claims the benefit of U.S. Provisional Application Ser. No. 61/431,394, filed on Jan. 10, 2011, the contents of which are all hereby incorporated by reference herein in their entirety.

BACKGROUND OF THE INVENTION

1. Field of the Invention

The present invention relates to a radio access system supporting a multi-radio access technology, and more particularly, to a method and apparatus for transceiving data over two or more heterogeneous networks.

2. Related Art

In a conventional radio communication environment supporting two or more heterogeneous networks, although a terminal has capabilities to access multi-RAT, the terminal is unable to access the multi-RAT at the same time and transmit and receive data to and from the two or more heterogeneous networks at the same time.

That is, a conventional terminal supporting multi-RAT accesses any one RAT based on switching and transmits and receives data over one network. Accordingly, if a terminal having multi-RAT capabilities transmits and receives data over a specific network and transmits and receives data over a network different from the specific network, the transmission and reception of data over any one network is stopped.

Accordingly, in the prior art, a terminal having capabilities supporting two or more heterogeneous networks is able to perform communication by using different networks, but efficiency is limited because the terminal operates based on simple switching.

Furthermore, since different networks independently operate, an inefficient operation is performed from a viewpoint of the overall flow management of a terminal.

A method for a terminal to simultaneously transceive data over two or more heterogeneous networks was defined. However, no concrete solution has been offered for specific details and methods for each operation.

Especially, in the case that a multi-RAT terminal sets up a connection with WLAN under the control of ABS, it is necessary to define an overall procedure for completing a connection setup with WLAN without errors.

Moreover, the definition of a multi-RAT state obtained after the multi-RAT terminal is connected to WLAN has not been clearly specified.

That is, in order to support fast data transmission to a WLAN as required, regardless of the current traffic characteristics or transmission rate, if a WLAN is found, an ABS may instruct the multi-RAT terminal to join an AP without condition. Here, if data transmission and reception via the WLAN do not occur immediately, the power of the terminal is wasted.

SUMMARY OF THE INVENTION

Accordingly, the present invention provides a method for a multi-RAT terminal to perform power saving after establishing a connection with AP, in order to enhance the power efficiency of the multi-RAT terminal. Specifically, the present invention defines an indicator for indicating whether a multi-RAT terminal makes a transition to power-saving mode.

Further, the present invention defines information (deadline and action time) required for a multi-RAT terminal to perform a detailed connection procedure and make a connection when accessing an AP under the control of ABS.

In an aspect, a method for a mobile station to transceive data to/from a first base station supporting a first radio access technology (RAT) and a second base station supporting a second RAT in a radio access system supporting multi-RAT is provided. The method includes performing a data communication for a first service flow with the first base station, receiving a first message, which instructs an access of the mobile station to the second base station, from the first base station in order for the mobile station to perform a data communication for a second service flow with the second base station. The first message includes at least one of action-time information indicating time at which the data communication for the second service flow with the second base station starts and association deadline information indicating effective time of an association procedure between the mobile station and the second base station. The method includes performing an access procedure with the second base station, and performing the data communication for the second service flow with the second base station according to the action-time information.

Further, the method may further include transmitting to the first base station a secondary system indication (SS-IND) message indicating success or failure of the access procedure with the second base station.

Further, The SS-IND message may comprise a MAC address or IP address of the second base station.

Further, performing the access procedure with the second base station may comprise receiving a beacon frame from the second base station, performing an authentication procedure with the second base station, and associating with the second base station using an association identifier (AID).

Further, the first message may further comprise mode change indication information indicating whether the mobile station makes a transition to the power-saving mode or not after associating with the second base station.

Further, the method may further include performing a scanning procedure on second base stations neighboring the first base station.

Further, performing the scanning procedure may comprise receiving from the first base station a scan command (SCN-CMD) message instructing the mobile station to perform scanning on the second base stations neighboring the first base station, and transmitting a scan report (SCN-REP) message to notify the first base station of the scanning result.

Further, performing the scanning procedure may comprise performing scanning on the second base stations neighboring the first base station, selecting a preferred second base station according to the scanning result, and transmitting a second system request (SS-REQ) message to the first base station to request a connection to the second base station. The SS-REQ message may include information on the selected preferred second base station.

Further, the method may further include receiving from the first base station a second message instructing the mobile station to disassociate with the second base station. The second message may include at least one of disconnection-time information indicating time at which the mobile station disassociates with the second base station and disassociation deadline information indicating effective time of a disassociation procedure between the mobile station and the second base station. The method may further include disassociating with the second base station according to the disconnection time, and performing the data communication for the first flow and the second service flow with the first base station.

Further, the method may further include receiving from the first base station a third message instructing the mobile station to reassociate with another second base station neighboring the first base station. The third message may include at least one of disconnection-time information indicating time at which the mobile station disassociates with the second base station and reassociation deadline information indicating effective time of a reassociation procedure between the mobile station and the second base station. The method may further include disassociating with the second base station according to the disconnection-time information, performing the reassociation procedure with the another second base station, and performing the data communication for the second service flow with the another second base station.

Further, the method may further include receiving from the first base station a fourth message instructing the mobile station to reassociate with another second base station neighboring the first base station. The fourth message may include at least one of disconnection-time information indicating time at which the mobile station disassociate with the second base station, action-time information indicating time at which the data communication for the second service flow with the another second base station starts and reassociation deadline information indicating effective time of a reassociation procedure between the mobile station and the second base station. The method may further include performing the reassociation procedure with the another second base station, disassociating with the second base station according to the disconnection-time information, performing the data communication for the second service flow with the another second base station according to the action-time information.

The third message or the fourth message may further comprise mode change indication information indicating whether the mobile station makes a transition to the power-saving mode or not after reassociating with the another second base station.

The first message may be a secondary system command (SS-CMD) message.

The second message, the third message, and the fourth message may be secondary system command (SS-CMD) messages.

In another aspect, a mobile station for transceiving data to/from a first base station supporting a first radio access technology (RAT) and a second base station supporting a second RAT in a radio access system supporting multi-RAT is provided. The mobile station includes a radio frequency unit for transceiving radio signals to/from the outside, and a controller to be connected to the radio frequency unit. The controller is configured to control the radio frequency unit to receive a second system command message, which instructs an access of the mobile station to a second base station, from the first base station in order for the mobile station to perform a data communication for a second service flow with the second base station. The second system command message includes at least one of action-time information indicating time at which the data communication for the second service flow with the second base station starts and association deadline information indicating effective time of an association procedure between the mobile station and the second base station. The controller performs the data communication for the second service flow with the second base station according to the action-time information.

The present invention has the advantage of being able to reduce the power consumption of a multi-RAT mobile station after the multi-RAT mobile station makes a connection with an AP, because the multi-RAT mobile station makes a transition to power-saving mode according to whether it performs data communication with AP or not.

Moreover, the present invention has the advantage of allowing a multi-RAT mobile station to perform data communication with an AP without errors, by providing a detailed procedure for the multi-RAT mobile station to make a connection with the AP.

BRIEF DESCRIPTION OF THE DRAWINGS

FIG. 2 is a flowchart showing a method of a multi-RAT MS transmitting and receiving data through a primary system and a secondary system.

FIG. 3 is another flowchart showing a method of a multi-RAT MS transmitting and receiving data through a primary system and a secondary system.

Figure 1A:
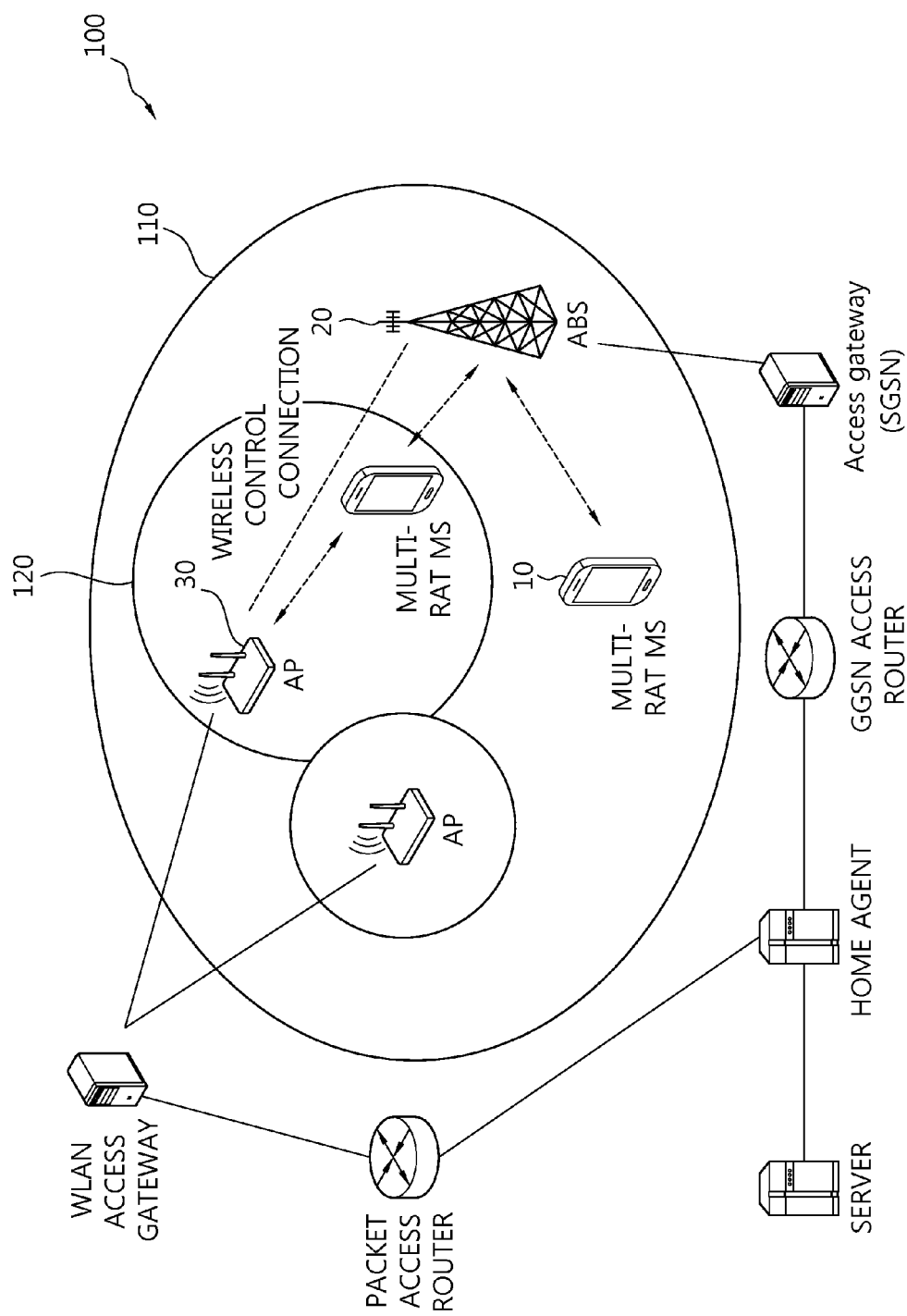
FIGS. 1(a) and 1(b) are conceptual diagrams showing a multi-RAT network to which an embodiment of the present invention can be applied.

DESCRIPTION OF EXEMPLARY
EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, evolved UTRA (E-UTRA), and the like. IEEE 802.16m, an evolution of IEEE 802.16e, provides backward compatibility with a system based on IEEE 802.16e.

The UTRA is part of a universal mobile telecommunications system (UMTS).

3rd generation partnership project (3GPP) long term evolution (LTE) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

At first, a multi-radio access technology (multi-RAT) network is described.

Figure 1B:
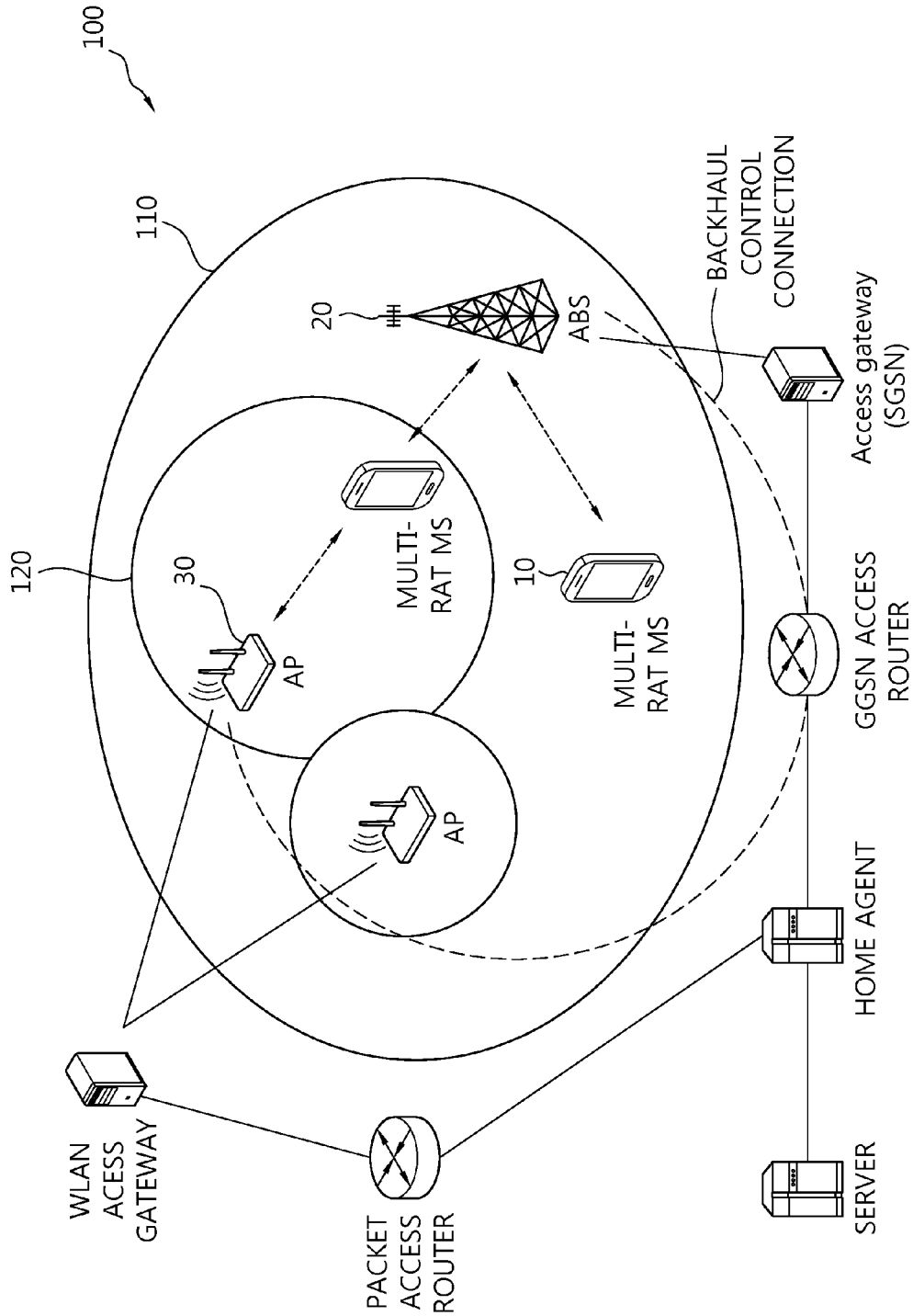

FIGS. 1(a) and 1(b) are conceptual diagrams showing a multi-RAT network to which an embodiment of the present invention can be applied.

A multi-radio access technology (hereinafter referred to as 'multi-RAT') network refers to a radio communication environment in which two or more heterogeneous networks are present and an MS is able to access two or more heterogeneous networks and perform communication at the same time.

Here, an MS capable of performing communication with the two or more heterogeneous networks at the same time is called a 'multi-RAT MS' or 'a multi-system MS'.

A heterogeneous network (or a heterogeneous system) refers to a network using a communication method different from a communication method used in a specific network on the basis of the specific network.

For example, a WiMAX network, that is an example of a mobile communication system, and a Wi-Fi network using a Wi-Fi network, correspond to heterogeneous networks.

RAT is a technique type used in radio access. For example, RAT can include a GSM/EDGE radio access network (GERAN), a UMTS terrestrial radio access network (UTRAN), an evolved-UMTS terrestrial radio access network (E-UTRAN), WiMAX, LTE (-A), and Wi-Fi. That is, a GERAN, a UTRAN, an E-UTRAN, WiMAX, and/or Wi-Fi are mixed in the same area.

As shown in FIG. 1, a multi-RAT network 100 can include a primary system 110 and a secondary system 120.

Here, the primary system 110 and the secondary system 120 can be represented by a first network and a second network, respectively. The primary system 110 can include a multi-RAT MS 10, a base station 20, and the secondary system 120, and the secondary system 120 can include the multi-RAT MS 10 and an AP 30.

The primary system is a system having a wide range of coverage and can be a mobile communication system. For example, the primary system can be a WiMAX or LTE (-A) system. Furthermore, the primary system refers to a system always having a status with the multi-RAT MS. That is, the primary system refers to a system which maintains an activation state, a sleep mode state, or an idle mode state with the multi-RAT MS.

The secondary system is a system having a small range of coverage and can be a WLAN communication system. For example, the secondary system can be a Wi-Fi system. That is, the secondary system refers to a system that can be added to or deleted from the multi-RAT network if necessary. Furthermore, the secondary system can be used for the transmission and reception of data which basically requires a higher bandwidth (BW). Accordingly, a specific flow (QoS) can be mapped for the use of the secondary system.

Here, a base station of the secondary system, for example, an access point (AP) can operate like an MS having capabilities capable of communicating with the primary system.

Furthermore, in a multi-RAT network, the primary system and the secondary system are associated with each other in a wired or wireless manner. That is, a base station in the primary system and a base station in the secondary system can be associated with each other over a backbone network (FIG. 1(b)) can be associated with each other wirelessly (FIG. 1(a)).

Hereinafter, it is assumed that the primary system is a WiMAX system and a secondary system is a Wi-Fi system unless otherwise described, for convenience of description. Accordingly, a base station corresponding to the primary system is called an 'ABS', and a base station corresponding to the secondary system is called an 'AP'. Furthermore, access to the primary system can be used as the same meaning as access to the ABS, and access to the secondary system can be used as the same meaning as access to the AP.

FIG. 2 is a flowchart showing a method of a multi-RAT MS transmitting and receiving data through a primary system and a secondary system.

Referring to FIG. 2, the multi-RAT MS performs an initial network entry process with the ABS (S210).

The multi-RAT MS sends an indicator, indicating that the multi-RAT MS is an MS supporting multi-RAT, to the ABS through the initial entry process with the ABS. Here, the indicator can be a multi-RAT MS capability field. Furthermore, the indicator, that is, the multi-RAT MS capability field, can have a size of one bit.

Furthermore, the indicator can be transmitted through a registration procedure performed during the initial network entry process with the ABS. In this case, the indicator can be transmitted to the ABS through a registration request or registration response (REG-REQ/RSP) message.

For example, when the indicator is set to '1', it indicates that an MS is an MS supporting multi-RAT. When the indicator is set to '0', it indicates that an MS is an MS not supporting multi-RAT.

Furthermore, when an REG-REQ message or an REG-RSP message including the indicator (e.g., set to '1') indicative of capabilities supporting multi-RAT is received from the multi-RAT MS, the ABS may send information, notifying that an additional multi-RAT capability negotiation process for supporting the multi-RAT MS will be performed, to the multi-RAT MS after the initial network entry process is finished or after a lapse of some time.

For example, when the notification information is set to '1', it indicates that the ABS and the multi-RAT MS perform an additional capability negotiation process in order to support multi-RAT. When the notification information is set to '0', it indicates that an additional capability negotiation process does not need to be performed.

Next, if the multi-RAT MS finishes the initial network entry process with the ABS, the multi-RAT MS and the ABS perform a multi-RAT capability negotiation process (S220).

Here, the multi-RAT capability negotiation process is commonly performed after a network (re)entry process is finished, but can be performed during a network (re)entry process with the ABS.

For example, if the multi-RAT capability negotiation process is performed during the network (re)entry process, the multi-RAT MS and the ABS can perform the multi-RAT capability negotiation process through the registration procedure process of the ABS and the multi-RAT MS. In this case, the multi-RAT MS and the ABS transmit and receive pieces of information regarding a multi-RAT capability negotiation through REG-REQ/REG-RSP messages.

The multi-RAT capability negotiation process of the multi-RAT MS and the primary system are described in more detail later.

Next, the multi-RAT MS performs an AP scanning process for access to the secondary system based on information related to the secondary system received from the ABS (S230).

Here, the multi-RAT MS performs a scanning process on neighbor APs periodically or in an event-triggered way for access to the secondary system.

First, it is assumed that association with all data transmitted to the multi-RAT MS is performed through a dynamic service (DSx) procedure with the ABS of the primary system and communication with the secondary system of the multi-RAT MS sends data regarding a specific flow to the secondary system under the determination of the ABS of the primary system.

Next, the multi-RAT MS performs a management (or operation) procedure with the secondary system (S240). Here, the management procedure with the secondary system refers to processes, such as association, disassociation, and re-association with the secondary system of the multi-RAT MS. Here, the management procedure of the secondary system is controlled by the primary system.

After performing the association procedure with the secondary system, the multi-RAT MS transmit and receive data through the AP of the secondary system.

Here, in order to access the secondary system, the multi-RAT MS has to receive an acknowledgement response for the access to the secondary system from the primary system.

That is, as described above, the ABS selects an AP that the multi-RAT MS accesses and checks the state of the selected AP before the multi-RAT MS sends the acknowledgement response to the access to the secondary system to the multi-RAT MS. If, as a result of the check, the access to the selected AP is possible, the ABS can send information about the multi-RAT MS to the selected AP in advance.

Furthermore, when the ABS sends the acknowledgement response to the multi-RAT MS, the ABS can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of the executed scanning on the AP for the access to the secondary system, the multi-RAT MS may request access to the secondary system to the base station of the primary system.

A message necessary for the management procedure of the secondary system can include the following messages.

1. A secondary system request (SS_REQ) message
: is used for the multi-RAT MS to request access to the AP.
2. A secondary system command (SS_CMD) message
: is a message used to manage access to the AP and is used for association, disassociation, or re-association with or from the AP.
3. A secondary system indication (SS_IND) message
: is a message used as a response to the secondary system command message and is used for the multi-RAT MS to inform the base station of an association success, a disassociation success, or a re-association success with the AP.

Next, if the access to the AP of the secondary system is successful, the multi-RAT MS is able to transmit and receive data to and from the primary system and transmit and receive data to and from the secondary system at the same time. Here, the data transmitted and received to and from the multi-RAT MS through the AP is controlled by the primary system.

A multi-RAT capability negotiation process between the multi-RAT MS and the ABS is described in detail below.

As described above, the multi-RAT capability negotiation process between the multi-RAT MS and the ABS is performed after network (re)entry.

Here, in the case of the network re-entry, the multi-RAT capability negotiation process can be omitted. This is because to perform the same procedure already performed when the multi-RAT MS re-enters the same system over a network generates an unnecessary overhead because capability negotiations for multi-RAT have already been performed through the initial network entry procedure between the multi-RAT MS and the ABS.

Furthermore, in the case of a handover (HO), a target base station of the primary system can perform multi-RAT capability negotiations with the multi-RAT MS in advance over a backbone network from the serving base station of the primary system.

A process of the multi-RAT MS performing the multi-RAT capability negotiation process with the primary system can be as follows.

First, the ABS can send information related to the secondary system to the multi-RAT MS. That is, if the ABS has common information about the APs of the secondary system that have to be received by the multi-RAT MS, the ABS can send the AP information to the multi-RAT MS in a broadcast or unicast way.

Here, the information related to the secondary system refers to information about a heterogeneous system that belongs to the same coverage as the primary system. Here, the multi-RAT MS may not need to know all secondary systems included in the primary system and information related to the secondary systems. In this case, the ABS does not send all pieces of information about the secondary systems and related to the secondary systems, but can send a list of pieces of information related to (necessary for) the multi-RAT MS to the multi-RAT MS in a unicast way. In this case, the list can be transmitted in the multi-RAT capability negotiation process.

Next, the multi-RAT MS sends a multi-system capability request message to the ABS. The multi-system capability request message can include, for example, the 802.11 MAC address of the MS, existing access AP information, and protocol version information of 802.11. The 802.11MAC address is necessary for authentication information. If the existing access AP information is included in the multi-system capability request message, the multi-system capability request message is transmitted to only a base station to which the existing access AP belongs.

Next, the ABS sends a multi-system capability response message to the multi-RAT MS in response to the multi-system capability request message.

The multi-system capability response message can include information about candidate APs.

Furthermore, if the multi-RAT MS enters idle mode, the ABS can store information, obtained through the multi-RAT capability negotiation process with the multi-RAT MS, for a certain time. That is, the ABS can newly define a multi-RAT information retention timer, can store the obtained information until the multi-RAT information retention timer expires, and can discard the obtained information after the timer expires.

Accordingly, if the multi-RAT MS performs network re-entry with the ABS before the multi-RAT information retention timer expires, the multi-RAT capability negotiation process can be omitted.

An operation (or management) method of the secondary system is described in detail below. Here, the operation of the secondary system refers to association or disassociation between the secondary system and the multi-RAT MS and re-association between the multi-RAT MS and the secondary system, and the operation of the secondary system is controlled by the ABS, that is, the primary system.

As an example of the operation method of the secondary system, a process of the multi-RAT MS accessing (or associating with) the secondary system, that is, a process of the multi-RAT MS adding the secondary system and transmitting and receiving data to and from the primary system and the secondary system at the same time, is described.

In order to access the secondary system, the multi-RAT MS or the ABS can perform a multi-RAT association request. In this case, the multi-RAT MS or the ABS can perform a multi-RAT association request process through a secondary system access request/response message.

If a secondary system is added at the request of the multi-RAT MS, when the multi-RAT MS detects the secondary system satisfying a specific condition by performing scanning, the multi-RAT MS can request association with the secondary system to the ABS by sending a secondary system request message to the ABS.

Furthermore, if a secondary system is added at the request of the ABS, when the ABS detects that specific flow association is generated in the multi-RAT MS, the ABS checks the state of an AP that can be accessed to the multi-RAT MS.

If, as a result of the check, access to the multi-RAT MS is possible, the ABS can instruct association between the multi-RAT MS and the secondary system by sending a secondary system access command message to the multi-RAT MS.

Here, control of the multi-RAT MS for accessing multi-RAT, that is, the transmission of control information, is performed by the base station of the primary system. In this case, QoS for corresponding data has only to comply with a method supported by a primary system because the multi-RAT MS simply performs data transmission and reception with the secondary system. In this case, the transmission of the control information can be performed through the secondary system access command message.

Here, the secondary system access command message can include information about a selected AP, information about a flow transmitted to the secondary system, and an authentication method (an open system or a shared key).

Next, the multi-RAT MS completes access to a specific AP and a traffic stream (TS) configuration with reference to AP information within the secondary system command message in response to an access command of the secondary system of the ABS. For example, an ADDTS request/response process of 802.11e can be performed.

Next, the multi-RAT MS informs the ABS of a result of an association success for the specific AP.

In this case, the association success can be performed through a secondary system indication (SS_IND) message. The secondary system indication message can include a result of the mapping of a flow ID (FID) and an association ID (AID)/traffic stream ID (TSID) for a corresponding flow.

Next, the multi-RAT MS transmits and receives data for a specific flow through the secondary system. That is, the multi-RAT MS transmits and receives data to and from the primary system and the secondary system at the same time according to a data flow.

That is, in the case of DL data, the ABS sends the DL data to the multi-RAT MS through the AP.

Furthermore, in the case of UL data, data for a specific flow ID indicated by the ABS is transmitted through the secondary system, for example, over a WLAN.

Furthermore, the multi-RAT MS can perform re-association or disassociation with the AP by transmitting and receiving the secondary system command/indication messages to and from the ABS.

Furthermore, if the multi-RAT MS gets out of the secondary system, for example, a WLAN coverage while transmitting and receiving data to and from the AP and there is no neighbor AP nearby, the ABS can control seamless flow mobility between the AP and the ABS so that the data transmitted to and received from the AP is seamlessly transmitted through the ABS of the primary system.

Furthermore, if the multi-RAT MS detects a neighbor AP while transmitting and receiving data to and from the AP of the secondary system, the ABS can perform control so that the data now being transmitted to and received from the multi-RAT MS is seamlessly transmitted from the AP to the neighbor AP.

A method of disassociating (or releasing) the secondary system is described below.

If the multi-RAT MS determines that a channel state with the secondary system now being accessed thereto is not good, the multi-RAT MS performs scanning on neighbor secondary systems.

If the multi-RAT MS determines that there is no detected secondary system as a result of the scanning into the neighbor secondary systems, the multi-RAT MS disassociates the secondary system now being accessed thereto.

In this case, if data corresponding to a specific flow of the primary system is being transmitted and received through the secondary system and the MS is unable to perform an HO to a neighbor AP secondary system, the ABS has to support multi-RAT seamless flow mobility so that seamless flow mobility can be performed without a data loss for the corresponding flow.

Or, in this case, when the multi-RAT MS completes the transmission of data transmitted to and received from the secondary system, the ABS can release association with the secondary system.

The re-association (or change) of the secondary system is described below. For example, the re-association may be a handover to a neighbor AP.

Here, it may be assumed that the re-association of the secondary system, that is, a handover between secondary systems, is performed on only specific association.

Here, the re-association of the secondary system, that is, a handover between the secondary systems, is seamlessly performed through the primary system.

If the multi-RAT MS determines that the channel state of the secondary system now being accessed thereto is not good, the multi-RAT MS or the base station can release association with the secondary system now being accessed thereto and request a handover (HO) to another secondary system.

That is, the ABS informs the multi-RAT MS that there is no longer data transmitted and received through a current serving secondary system by sending an SS-CMD message to the multi-RAT MS. Next, the ABS instructs the multi-RAT MS to transmit and receive existing transmitted data through the primary system. If the transmission of the existing data is completed, the ABS instructs the multi-RAT MS to transmit and receive data to and from a new secondary system. That is, a seamless handover between the secondary systems can be performed through the primary system.

Furthermore, when the multi-RAT MS performs a handover between primary systems, if the coverage of the secondary system is located at the boundary of the primary systems, the multi-RAT MS can perform a handover between the primary systems seamlessly by using the secondary system.

Furthermore, if the multi-RAT MS moves within the primary system, for example, WiMAX coverage at high moving speed, the base station can instruct the multi-RAT MS not to access the secondary system although the multi-RAT MS has entered the coverage of the secondary system. That is, this management of the secondary system can be performed based on the speed of the multi-RAT MS.

FIG. 3 is another flowchart showing a method of a multi-RAT MS transmitting and receiving data through a primary system and a secondary system.

Referring to FIG. 3, at step S310, the multi-RAT MS performs an initial network entry process with a base station (ABS) (S310). Here, the multi-RAT MS and the base station can inform the other party that they support multi-RAT through the initial network entry process.

Information informing that the multi-RAT MS or the base station supports multi-RAT can be transmitted through a registration request or registration response (REG-REQ/RSP) message.

At step S320, the multi-RAT MS performs a multi-RAT capability negotiation process with the base station (ABS) in order to access an AP (S320). Here, the multi-RAT MS transmits control information, indicating a specific traffic characteristic or a specific quality of service (QoS) type on which data is preferred to be transmitted and received through the AP, to the base station (S321). Here, the control information can be transmitted through a multi-system request message.

As shown in FIG. 3, if the control information indicates service in which a traffic characteristic requires a data rate of 10 Mbps or more, it indicates that a service flow generated for traffic transmission that satisfies the traffic characteristic preferably is transmitted and received through the AP.

The service in which the traffic characteristic requires a data rate of 10 Mbps or more corresponds to an embodiment, and the traffic characteristic can indicate a QoS type value, such as the best effort.

Furthermore, the multi-RAT MS can transmit and receive data for a service flow, not requiring a traffic characteristic having a data rate of 10 Mbps or more, to and from the base station, and the data may be transmitted and received through the AP by the determination of the base station.

Data for a service flow '0' can be transmitted and received to and from the base station.

Next, the multi-RAT MS and the base station can newly generate a service flow '1', requiring a data rate of 10 Mbps or more, through a dynamic service addition (DSA) process (S330).

Next, the multi-RAT MS can transmit and receive data, corresponding to the newly generated service flow '1', to and from the AP through steps S340 and S350.

Step S350 is described in more detail. The base station transmits a secondary system command (SS-CMD) message, instructing access an AP 2 and the transmission and reception of the data for the service flow '1' to and from the AP 2, to the multi-RAT MS (S351). Here, information included in the SS-CMD message and indicating the transmission and reception of the data for the service flow '1' to and from the AP 2 means acknowledgement for control information transmitted from the multi-RAT MS to the base station.

Next, the multi-RAT MS performs access to the AP 2 (S352) and transmits a secondary system indication (SS-IND) message, informing that the multi-RAT MS has been associated with the AP 2, to the base station (S353).

Next, the multi-RAT MS performs communication with the base station in the case of data corresponding to the service flow '0' (S354) and performs communication with the AP 2 in the case of data corresponding to the service flow '1' (S355).

Hereinafter, the association, reassociation, disassociation, and power-saving mode of IEEE 802.11 WLAN will be discussed briefly.

Connection Process

Figure 4:
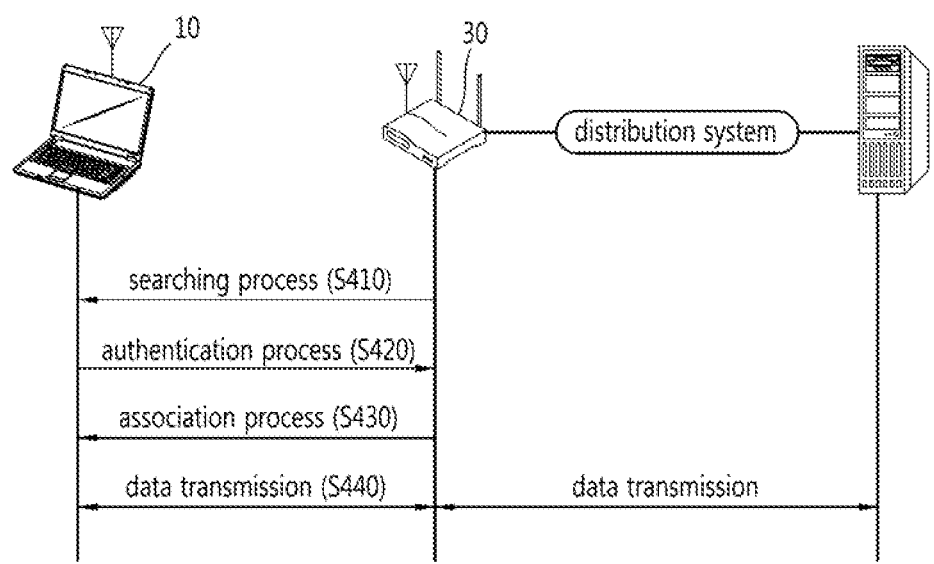
FIG. 4 is a flowchart showing a connection process for data transmission in a WLAN system.

FIG. 4 is a flowchart showing a connection process for data transmission in a WLAN system.

Referring to FIG. 4, a connection process for data transmission between a station (STA or terminal) 10 and an access point (AP or base station) 30 in a WLAN system includes a scanning S410, an authentication S420, and an association S430. The STA 10 and the AP 30 perform data transmission S440 via the aforementioned steps S410, S420, and S430.

The scanning S410 is a step of searching for a neighboring AP 30 by using a beacon or probe message.

The scanning S410 includes passive scanning for searching for the AP 30 from a beacon message periodically transmitted by the AP 30 and active scanning for selecting the AP 30 by transmitting a probe request of the STA 10 and then receiving a probe response containing its service set ID (SSID), an operation speed, etc., from the AP 30. The beacon message contains several capabilities (i.e., speed, encryption, etc.) that can be supported by the AP 30 and an SSID which is the name of a service group to which the AP belongs.

The authentication S420 is a step in which the STA 10 which selects the proper AP 30 through the scanning S410 proves to the AP 30 that the STA 10 is a valid STA. That is, the authentication S420 is a step of negotiating an authentication procedure and an encryption scheme with the AP 30. Since an open system authentication scheme is used in most cases, the AP 30 unconditionally authenticates upon receiving an authentication request from the STA. Examples of further enforced authentication include IEEE 802.1x-based EAP-TLS, EAP-TTLS, EAP-FAST, PEAP, etc.

The association S430 is a step in which the STA 10 accesses to the AP 30 after the authentication is successful. The association S430 implies that an identifiable connection is established between the STA 10 and the AP 30. When the association S430 is finished, the STA 10 can communicate with another STA via the AP 30.

The association S430 is performed in such a manner that, when the STA 10 transmits an association request to the AP 30, the AP 30 transmits an association response containing an association ID (AID) for identifying the STA from another STA.

The STA 10 and the AP 30 perform data transmission S440 through the aforementioned steps S410, S420, and S430.

Reassociation Process

Reassociation is similar to the association S430. The reassociation is a step in which the STA 10 is associated with another AP different from the associated AP 30. The reassociation is a step of establishing a new connection with another new AP when a signal from the AP 30 associated with the STA 10 becomes weak.

Reassociation occurs when the STA 10 moves to another AP coverage. The reassociation is performed through a reassociation request frame and a reassociation response frame.

Moreover, information about a MAC address of the current AP (old AP) is transmitted to a reassociated AP (new AP). The new AP transmits to an inter-AP protocol (IAPP) a request to relay information about the old AP, and the old AP deletes the AID of the STA 10.

The IAPP refers to a protocol for exchanging context between APs through a distribution system (DS) in a WLAN system. That is, in the IAPP, PMK information that the new AP has exchanged with the old AP is cached, and when the STA 10 transmits to the new AP a reassociation request by using the key ID used for the old AP, the new AP omits authentication because of the use of the cached PMK, and performs a key exchange with the STA 10.

Disassociation Process

The disassociation process is performed by notice (or notification), rather than transmitting a request.

APs may need to disassociate STAs 10 to enable the AP to be removed from a network for service or for other reasons.

The disassociation process is performed by transmitting a disassociation frame containing a reason code.

Power-Saving Mode

In a power-saving mode (PSM) of the WLAN system 100, the STA 10 periodically repeats a sleep state and an active state to reduce power consumption. The PSM is a mode in which, when the STA 10 does not transmit data in order to save power, or when there is no frame to be delivered to the STA, the STA 10 temporarily stops an operation of a transceiver of which power consumption is high. Also, the PSM may be expressed in sleep mode or doze mode.

In the PSM, each STA 10 operates in any one of the two states, i.e., the sleep state and the active state, and transmits data by transitioning from the sleep state to the active state whenever there is data to be transmitted by the STA.

In addition, the AP 30 which always powers on must be able to transmit a packet to the STA 10 in the sleep state. For this, all STAs 10 in the sleep mode must wake up at the same time to determine whether there is a packet to be transmitted by the AP 30 to the STAs 10, and if the packet exists, must request transmission thereof. Herein, all of the STAs 10 can wake up at the same time because the STAs use a clock common to the AP 30.

Each STA 10 specifies a listen interval, which is a multiple of a beacon transmission period, to an association request message when it is initially associated with the AP 30, and if the STA enters the sleep mode, notifies a wake-up period to the AP 30.

During at least this period, the AP 30 must buffer frames to be relayed to the STA 10. Even if such an operation is not performed in an initial stage, since each STA 10 enters the sleep mode when necessary, if there is a frame to be transmitted to the STA, the STA can transmit to the AP 30 a null data frame in which a power management field is set to '1' for the AP 30 to buffer the frame to be transmitted to the STA, and upon receiving ACK thereof from the AP 30, can enter the sleep mode. Thereafter, the STA 10 temporarily wakes up around a time at which a beacon is received, and waits for a beacon message transmitted by the AP 30.

For the STAs 10 in the sleep mode, the AP 30 buffers frames to be transmitted to the STAs 10. The AP 30 transmits a traffic indication map (TIM) element for enumerating a list of the STAs 10 which must have the buffered frames, by carrying the TIM element on the beacon message. That is, by using the TIM element of the beacon, the AP reports to each STA about whether there is a frame to be received.

If a frame to be received by the STA is buffered in the AP 30, the STA 10 remains in the active state. Further, the STA 10 transmits a PS-Poll frame to the AP 30, and thus requests the AP 30 to transmit the buffered frames. If the frame to be transmitted by the STA is not buffered in the AP 30, the STA 110 enters the sleep state.

The TIM element is roughly classified into two types, i.e., TIM and delivery TIM (DTIM). The TIM is used to indicate a unicast frame. The DTIM is used to indicate a multicast/broadcast frame.

Hereinafter, the association, disassociation, and reassociation between a multi-RAT MS and a second base station under the control of a first base station in a multi-RAT system suggested in the present invention will be described more concretely. As defined above, the first base station is denoted by 'ABS', and the second base station is denoted by 'AP'.

Association Process

Figure 5:
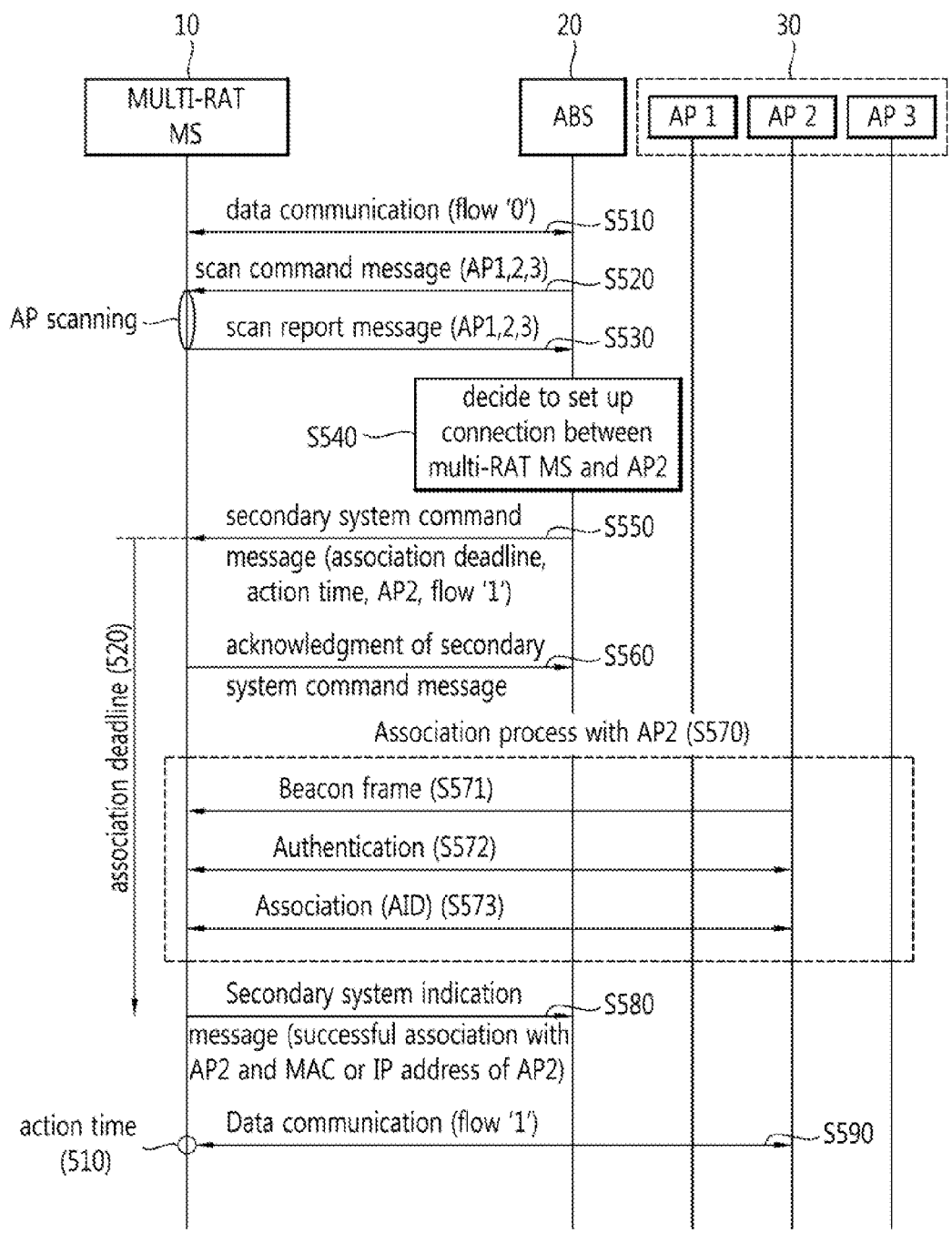
FIG. 5 is a flowchart showing an association process between a multi-RAT MS and an AP according to an embodiment of the present invention.

FIG. 5 is a flowchart showing an association process between a multi-RAT MS and an AP according to an embodiment of the present invention.

As shown in FIG. 5, a multi-RAT MS transceives (or communicates) data for flow '0' to/from an ABS (S510).

Afterwards, the ABS instructs the multi-RAT MS to perform scanning of APs (APs 1, 2, and 3) neighboring the ABS (S520). In this case, the scanning instruction can be carried out through a scan command (SCN-CMD) message or a DSx message used in a dynamic service process (DSx). In this case, a message exchanged through the dynamic service process may be a dynamic service addition (DSA) message, a dynamic service change (DSC) message, or a dynamic service delete (DSD) message.

Afterwards, the multi-RAT MS performs scanning of the APs 1, 2, and 3.

Afterwards, the multi-RAT MS reports a scanning result of the APs 1, 2, and 3 to the ABS (S530). In this case, the reporting of the scanning result may be carried out through a scan report (SCN-REP) message or a message used in the dynamic service (DSx) process of S520.

Afterwards, the ABS selects (or chooses) an AP to associate with the multi-RAT MS, based on the scanning result received from the multi-RAT MS (S540). Referring to FIG. 5, the ABS selects the AP 2, among the APs 1, 2, and 3, as an AP to associate with the multi-RAT MS.

Afterwards, the ABS transmits to the multi-RAT MS a secondary system command (SS-CMD) message indicating an association with the selected AP (AP2) (S550).

The SS-CMD message may include information about the selected AP to associate with the multi-RAT MS, flow information to be transmitted to the selected AP, information such as shared key information related to an authentication method, instruction information instructing the multi-RAT MS to make a transition to the power-saving mode (doze mode) or not after associating with the AP, information about the association deadline (or association deadline timer) 520 indicating the effective time before which the multi-RAT MS associates with the AP after receiving an SS-CMD message from the ABS, information about the action time 510 indicating the start time of data communication with the AP to be associated with, and so on. In this case, if the instruction information instructs the multi-RAT MS to make a transition to the doze mode, the multi-RAT MS enters the power-saving mode after associating with the AP. Moreover, the multi-RAT MS may inform the ABS of the transition to the doze mode. The action time is a value after the association deadline.

Afterwards, the multi-RAT MS transmits to the ABS a message acknowledged (MSG-ACK) message upon receipt of the SS-CMD message.

Afterwards, the multi-RAT MS performs an association process with the selected AP (AP 2) (S570). Here, the association process with the selected AP is performed by the following procedure.

First, the multi-RAT MS performs synchronization with the selected AP by receiving a beacon frame from the selected AP (AP 2).

Afterwards, the multi-RAT MS performs an authentication procedure with the selected AP (AP 2) (S572). The authentication procedure may be done using open system or shared key.

Afterwards, the multi-RAT MS is assigned with an association identifier (AID) from the selected AP and performs an association procedure with the selected AP, by transceiving an association request/response frame to/from the selected AP (AP 2) (S573).

Afterwards, the multi-RAT MS transmits to the ABS a secondary system indication (SS-IND) message containing a connection state value which indicates the success or failure of the association with the selected AP within the association deadline (or before the association deadline timer expires) (S580).

In this case, if the multi-RAT MS transmits the SS-IND message indicating the success of the association with selected AP, the SS-IND message further includes the IP address value of the selected AP.

However, if the ABS receives from the multi-RAT MS the SS-IND message indicating the failure of the association with the selected AP (AP 2) within the association deadline, or does not receive the SS-IND message from the multi-RAT MS within the association deadline, the ABS selects a new AP to associate with the multi-RAT MS. Thereafter, the ABS re-transmits to the multi-RAT MS an SS-CMD message containing information related to the new AP. The association deadline timer starts when the SS-CMD message is transmitted, and set to a value, considering all of the synchronization/authentication/association with the AP to associate with the multi-RAT MS.

Afterwards, the multi-RAT MS communicates data for flow '1' with the AP 2 and data for flow '0' with the ABS (S590). Here, the step S590 is carried out during the action time (S510).

Figure 6:
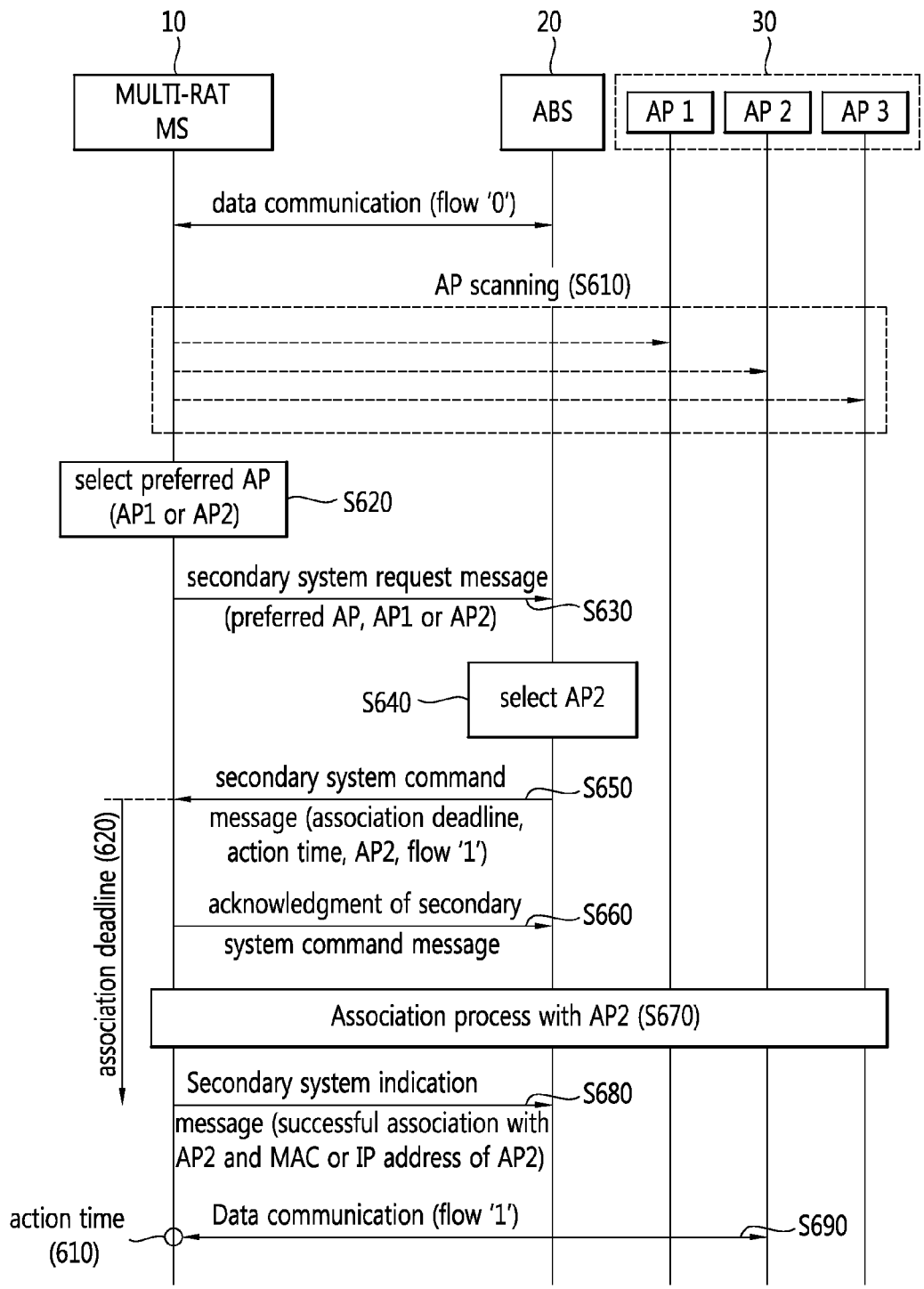
FIG. 6 is a flowchart showing an association process between a multi-RAT MS and an AP according to another embodiment of the present invention.

FIG. 6 is a flowchart showing an association process between a multi-RAT MS and an AP according to another embodiment of the present invention.

The steps S640 to S690 of FIG. 6 are identical to the steps S540 to S590 of FIG. 9, so only the differences will be discussed below.

Referring to FIG. 6, the multi-RAT MS performs scanning of APs (APs 1, 2, and 3) neighboring the ABS (S610). In this case, if the condition of scanning of the APs is satisfied, the multi-RAT MS performs scanning of the APs neighboring the ABS, without receiving a scan command message instructing the multi-RAT MS to perform scanning from the ABS.

Afterwards, the multi-RAT MS determines to set up a connection with a preferred AP (AP 1 or AP 2) according to a scanning result.

Afterwards, the multi-RAT MS transmits to the ABS a secondary system request (SS-REQ) message containing information about the selected preferred AP and requesting to set up a connection with the AP (S630). Upon receiving the SS-REQ message from the multi-RAT MS, the ABS selects an AP (AP 2), and transmits to the multi-RAT MS an SS-CMD message instructing the multi-RAT MS to set up a connection with the selected AP.

Reassociation Process

Figure 7:
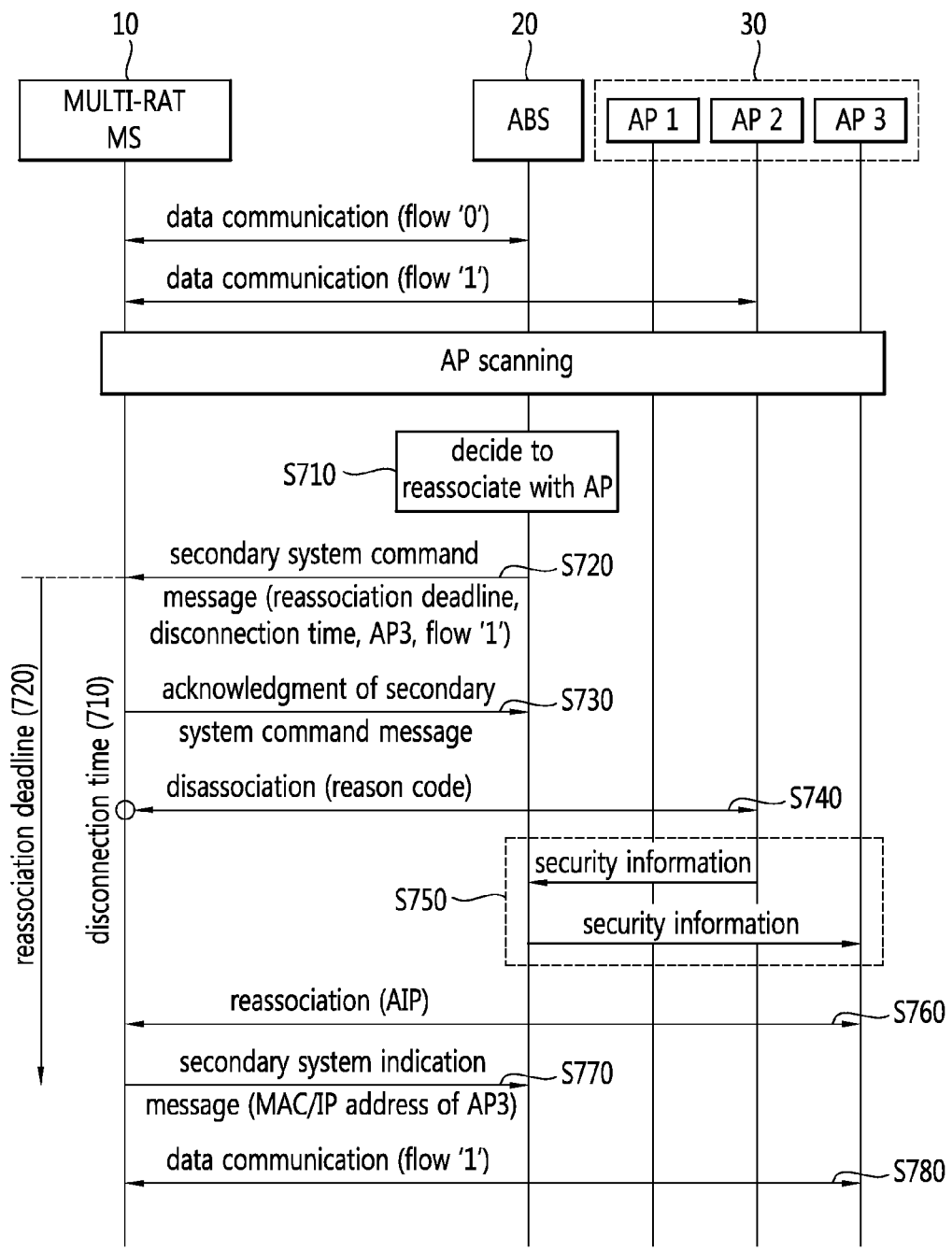
FIG. 7 is a flowchart showing a reassociation process between a multi-RAT MS and an AP in according to an embodiment of the present invention.

FIG. 7 is a flowchart showing a reassociation process between a multi-RAT MS and an AP in according to an embodiment of the present invention.

Referring to FIG. 7, the multi-RAT MS communicates data for flow '0' with the ABS and data for flow '1' with the AP 2.

In this case, the ABS may instruct the multi-RAT MS to set up a connection with a new AP (AP 3) beside the currently connected AP (AP 2).

Specifically, the ABS instructs the multi-RAT MS to perform scanning of APs (APs 1, 2, and 3) neighboring the ABS through a scan command message or dynamic service message (e.g., dynamic service addition/change/delete messages).

Afterwards, the multi-RAT MS performs scanning of neighboring APs, and transmits a scanning result to the ABS through a scan report message or dynamic service message.

Afterwards, the ABS selects an AP (AP 3) to reassociate with the multi-RAT MS, based on the scanning result received from the multi-RAT MS, and decides to perform an inter-AP handover to the selected AP (AP 3) (S710).

Afterwards, the ABS transmits to the multi-RAT MS a secondary system command (SS-CMD) message instructing the multi-RAT MS to set up a re-connection with the AP 3 (S710).

Here, the SS-CMD message may include an AP to reassociate with (or a new AP to connect with), flow information to be transmitted to the AP (secondary system) to reassociate with, shared key information, instruction information instructing the multi-RAT MS to make a transition to the doze mode after reassociation, information about the disconnection time indicating the time of disassociation with the currently connected (or associated) AP, information about the reassociation deadline (or reassociation deadline timer) indicating the effective time before which the multi-RAT MS has to set up a connection with the AP to reassociate with after receiving the SS-CMD message, and so on. In this case, the reassociation deadline timer starts when the SS-CMD message is transmitted.

Afterwards, the multi-RAT MS disassociates with the currently connected AP (AP 2) at the disconnection time 710 (S740). The multi-RAT MS may transmit to the ABS a response to receipt of the SS-CMD message (S730).

Herein, the ABS may serve to operate (initiate) the reassociation deadline timer and deliver the security context set by the old AP (AP 2) to the new AP (AP 3) by a control connection with neighboring APs (via air or backbone) in advance while reassociation with the AP 3 is being performed (S750).

Afterwards, the multi-RAT MS performs a reassociation process with the AP 3 using a reassociation identifier (AID) (S760).

Afterwards, the multi-RAT MS transmits to the ABS an SS-IND message indicating the success or failure of the association with the new AP (AP 3) within the reassociation deadline (or before the association deadline timer expires 720) (S770).

That is, the SS-IND message includes at least one of a connection state value indicating the success or failure of the association with the new AP and an IP address value assigned from the new AP.

However, if the ABS receives from the multi-RAT MS the SS-IND message indicating the failure of the association with the new AP, or does not receive the SS-IND message from the multi-RAT MS until the reassociation deadline timer expires, the ABS selects a new AP to associate with the multi-RAT MS. Then, the ABS re-transmits to the multi-RAT MS an SS-CMD message containing information related to the new selected AP.

Afterwards, if the reassociation with the new AP (AP 3) succeeds, the multi-RAT MS communicates data for flow '1', which has been transmitted/received to/from the previous AP (AP 2), with the AP 3 (S780).

Figure 8:
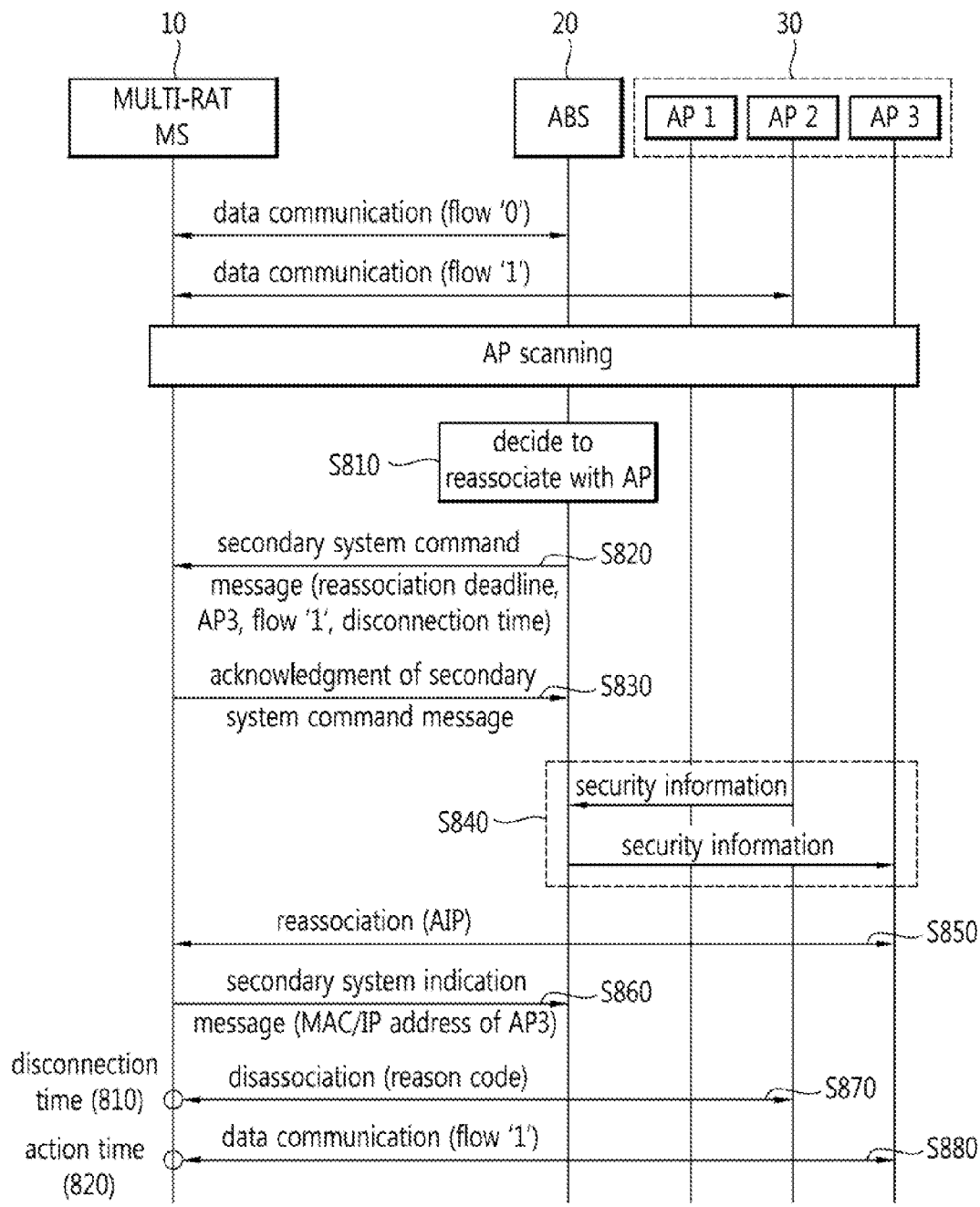
FIG. 8 is a flowchart showing a reassociation process between a multi-RAT MS and an AP according to another embodiment of the present invention.

FIG. 8 is a flowchart showing a reassociation process between a multi-RAT MS and an AP according to another embodiment of the present invention.

Unlike FIG. 7, FIG. 8 shows a process of terminating a connection with the previous AP (AP 2) after establishing a connection with a new AP (AP 3) to reassociate with. Accordingly, only the differences with FIG. 7 will be explained, and unexplained parts are identical to those of the steps in FIG. 7.

The multi-RAT MS receives from the ABS an SS-CMD message further including action time information indicating the time at which data communication with the AP (AP 3) to reassociate with starts (S820).

Afterwards, the multi-RAT MS performs a reassociation process with the AP (S850), and if the reassociation with the AP 3 succeeds, it disassociates with the previous AP, i.e., AP 2, at the disconnection time 810 (S870). Then, the multi-RAT MS communicates data for flow '1' with the AP 3 at the action time 820.

Disassociation Process

Figure 9:
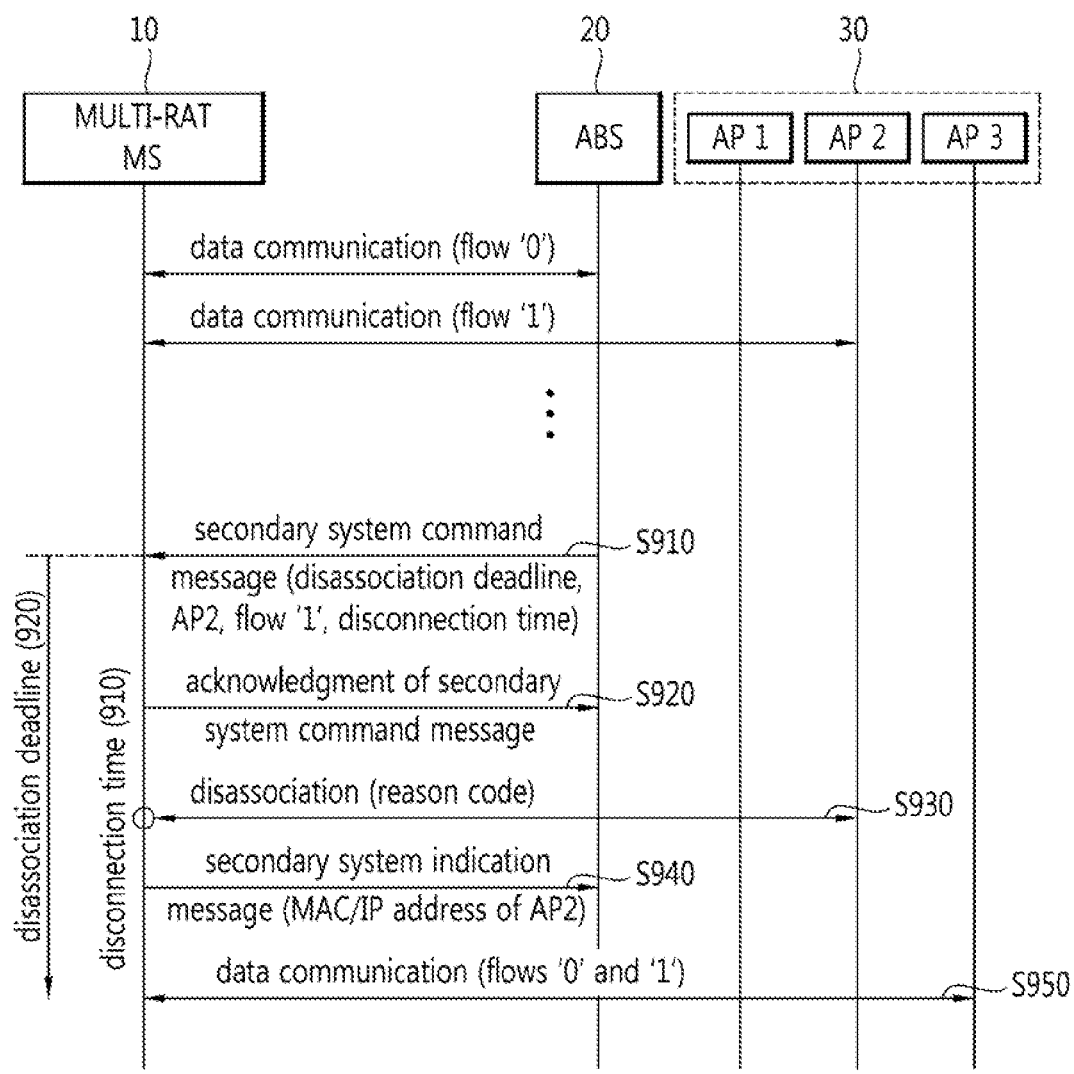
FIG. 9 is a view showing a disassociation process between a multi-RAT MS and an AP according to an embodiment of the present invention.

FIG. 9 is a view showing a disassociation process between a multi-RAT MS and an AP according to an embodiment of the present invention.

As shown in FIG. 9, the multi-RAT MS communicates data for flow '0' with the ABS and data for flow '1' with the AP.

The ABS transmits to the multi-RAT MS an AAI-SS-CMD message instructing the multi-RAT MS to disassociate with the currently connected AP 2 (S910). The SS-CMD message may include an AP to disassociate with, flow information to disassociate with, information about the disconnection time (or action time) indicating the time at which the association with the currently connected AP is terminated, information about the disassociation deadline indicating the effective time before which the multi-RAT MS has to disassociate with the currently connected AP, and so on. Here, the disassociation deadline information may be a disassociation deadline timer.

Afterwards, the multi-RAT MS transmits to the ABS a response to receipt of the SS-CMD message (S920). Here, the response is an acknowledgment.

Afterwards, the multi-RAT MS disassociates with the currently connected AP 2 (S930). That is, the multi-RAT MS cuts off its connection with the AP 2 at the disconnection time. The multi-RAT MS may be disconnected from the AP2 by transmitting to the AP 2 a disassociation notification frame at the disconnection time and receiving from the AP 2 an ACK of the disassociation notification frame.

Afterwards, the multi-RAT MS transmits to the ABS an SS-IND message indicating the success of the disconnection from the AP 2 (S940). The SS-IND message includes the MAC address or IP address of the AP disconnected from the multi-RAT MS, i.e., the AP 2.

Afterwards, the multi-RAT MS communicates data for flow '0' and flow '1' with the ABS (S950).

Here, the SS-IND message may be transmitted to the ABS before (S940) or after the multi-RAT MS communicates data for flow '0' and flow '1' with the ABS.

In another example, the multi-RAT MS may transmit an unsolicited AAI-SS-IND message to the ABS. That is, if the multi-RAT MS is disconnected from the AP 2 when it has not received the SS-CMD message from the ABS, the multi-RAT MS transmits the unsolicited AAI-SS-IND message to the ABS to notify the ABS of the disconnection from the AP 2.

Moreover, a method for a multi-RAT MS to perform power saving after associating or reassociating with an AP in a multi-RAT system proposed in the present invention will be discussed.

Figure 10:
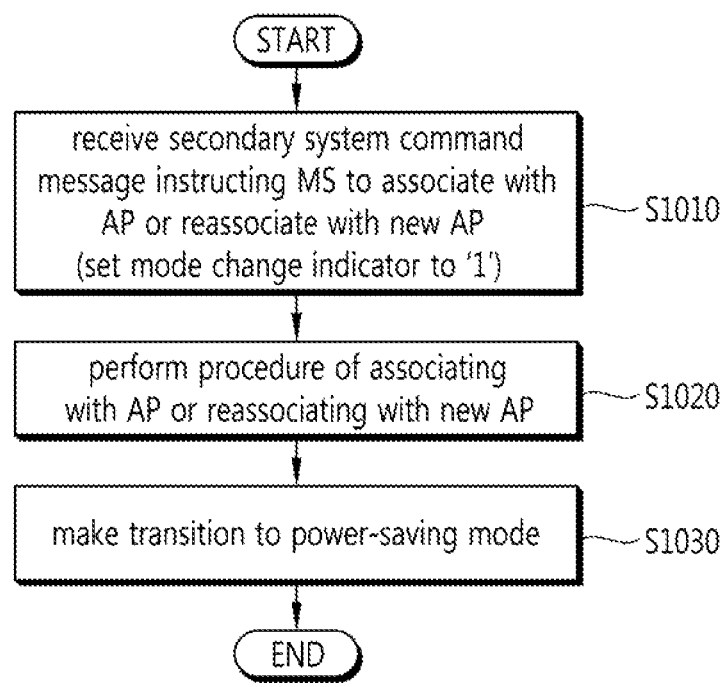
FIG. 10 is a flowchart showing a method for a multi-RAT MS to make a transition to power-saving mode after associating or reassociating with an AP according to an embodiment of the present invention.

FIG. 10 is a flowchart showing a method for a multi-RAT MS to make a transition to power-saving mode after associating or reassociating with an AP according to an embodiment of the present invention.

The multi-RAT MS receives from the ABS a secondary system command (SS-CMD) message instructing the multi-RAT MS to set up a connection with an AP or reassociate with a new AP (S1010). The SS-CMD message includes a mode change indicator indicating whether the multi-RAT MS makes a transition to the power-saving mode (doze mode) or not immediately after associating with an AP or reassociating with a new AP. In one example, if the mode change indicator is set to '1', it may indicate that the multi-RAT MS makes a transition to the power-saving mode immediately after associating or reassociating with an AP, and if the mode change indicator is set to '0', it may indicate that the multi-RAT MS maintains the active mode after associating or reassociating with an AP.

Afterwards, the multi-RAT MS performs a procedure of associating with an AP or reassociating with a new AP (S1020).

Afterwards, if the mode change indicator indicates a transition to the power-saving mode, the multi-RAT MS makes a transition to the power-saving mode immediately upon completion of the association or reassociation process with an AP (S1030).

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 11.

Figure 11:
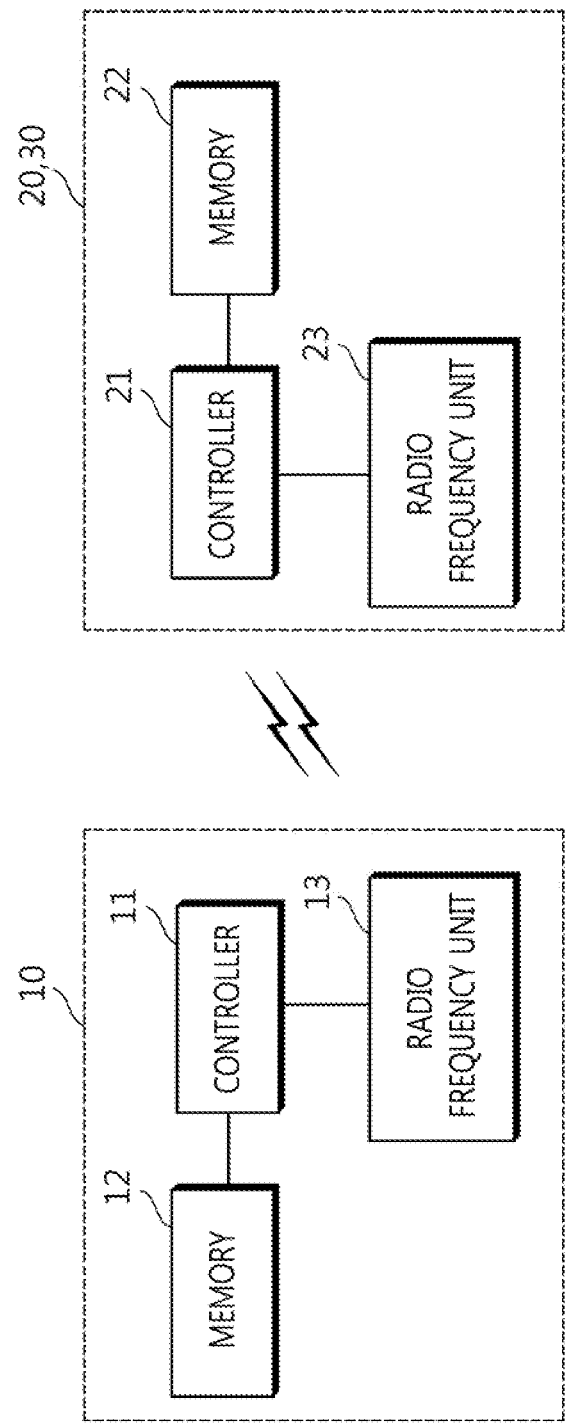
FIG. 11 is a block diagram showing internal structures of an MS and a BS in a wireless access system according to an embodiment of the present invention.

FIG. 11 is a block diagram showing internal structures of an MS and a BS in a wireless access system according to an embodiment of the present invention.

An MS 10 includes a controller 11, a memory 12, and a radio frequency (RF) unit 13.

The MS 10 can be fixed or mobile and can be called another terminology, such as user equipment (UE), a user terminal (UT), a subscriber station (SS), a wireless device, or an advanced mobile station (AMS). Furthermore, the MS includes the multi-RAT MS.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20, 30 includes a controller 21, a memory 22, and an RF unit 23.

Here, the BS 20, 30 commonly refers to a fixed station communicating with the MS, and the base station can be called another terminology, such as a NodeB, a base transceiver system (BTS), or an access point. One or more cell can be present in one base station.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method for a mobile station to transceive data to/from a first base station supporting a first radio access technology (RAT) and a second base station supporting a second RAT in a radio access system supporting multi-RAT, the method comprising:

performing a data communication via a first service flow with the first base station;

receiving a first message, which instructs an access of the mobile station to the second base station, from the first base station in order for the mobile station to perform a data communication via a second service flow with the second base station, the first message including action-time information indicating time at which the data communication via the second service flow with the second base station starts and association deadline information indicating effective time of an access procedure between the mobile station and the second base station;

performing the access procedure with the second base station before an association deadline timer configured based on the association deadline information is expired; and performing the data communication via the second service flow with the second base station based on the action-time information if the access procedure is successful before the association deadline timer is expired, wherein if the access procedure is not successful before the association deadline time is expired, a new base station is selected to be associated with the mobile station, wherein the association deadline information is determined based on a synchronization procedure, an authentication procedure, and an association procedure between the second base station and the mobile station, and wherein the first message further includes flow information to determine whether the data communication is performed via the first service flow or the second service flow.

2. The method of claim 1, further comprising transmitting to the first base station a secondary system indication (SS-IND) message indicating success or failure of the access procedure with the second base station.

3. The method of claim 2, wherein the SS-IND message comprises a MAC address or IP address of the second base station.

4. The method of claim 1, wherein performing the access procedure with the second base station comprises:
receiving a beacon frame from the second base station;
performing the authentication procedure with the second base station; and
associating with the second base station using an association identifier (AID).

5. The method of claim 1, wherein the first message further includes mode change indication information indicating whether or not the mobile station makes a transition to a power-saving mode after associating with the second base station.

6. The method of claim 1, further comprising performing a scanning procedure on a plurality of second base stations neighboring the first base station.

7. The method of claim 6, wherein performing the scanning procedure comprises:
receiving from the first base station a scan command (SCN-CMD) message instructing the mobile station to perform scanning on the plurality of second base stations; and
transmitting a scan report (SCN-REP) message to notify the first base station of a scanning result.

8. The method of claim 6, wherein performing the scanning procedure comprises:
performing scanning on the plurality of second base stations;
selecting the second base station according to a scanning result; and transmitting a second system request (SS-REQ) message to the first base station to request a connection to the second base station, and wherein the SS-REQ message includes information on the selected second base station.

9. The method of claim 1, further comprising:
receiving from the first base station a second message instructing the mobile station to disassociate from the second base station, the second message including disconnection-time information indicating time at which the mobile station disassociates from the second base station and disassociation deadline information indicating effective time of a disassociation procedure between the mobile station and the second base station; and performing the disassociation procedure with the second base station based on the disconnection-time information, wherein the data communication via the second service flow is performed via the first service flow after the disassociation procedure is successful before the effective time of the disassociation procedure is expired.

10. The method of claim 1, further comprising:
receiving from the first base station a third message instructing the mobile station to reassociate with another second base station neighboring the first base station, the third message including at least one of disconnection-time information indicating time at which the mobile station disassociates from the second base station, action-time information indicating time at which the data communication for the second service flow with the another second base station starts, or reassociation deadline information indicating effective time of a reassociation procedure between the mobile station and the another second base station; and performing a disassociation procedure with the second base station based on the disconnection-time information;

performing the reassociation procedure with the another second base station based on the reassociation deadline information when the disassociation procedure is successful; and performing the data communication via the second service flow with the another second base station based on the action-time information when the reassociation procedure is successful before a reassociation deadline timer configured based on the reassociation deadline information is expired, wherein the second base station transmits a security context configured to the second base station to the another second base station during the reassociation procedure, and wherein the third message further includes flow information to determine whether the data communication is performed via the first service flow or the second service flow.

11. The method of claim 1, wherein the first message is a secondary system command (SS-CMD) message.

12. A mobile station for transceiving data to/from a first base station supporting a first radio access technology (RAT) and a second base station supporting a second RAT in a radio access system supporting multi-RAT, the mobile station comprising:
a radio frequency unit for transceiving radio signals to/from the outside; and
a controller connected to the radio frequency unit,
wherein the controller is configured to:

control the radio frequency unit to receive a system command message, which instructs an access of the mobile station to the second base station, from the first base station in order for the mobile station to perform a data communication via a service flow with the second base station, the system command message including action-time information indicating time at which the data communication via the service flow with the second base station starts and association deadline information indicating effective time of an access procedure between the mobile station and the second base station;

perform the access procedure with the second base station before an association deadline timer configured based on the association deadline information is expired; and perform the data communication via the service flow with the second base station according to the action-time information if the access procedure is successful before the association deadline timer is expired, wherein if the access procedure is not successful before the association deadline time is expired, a new base station is selected to be associated with the mobile station, wherein the association deadline information is determined based on a synchronization procedure, an authentication procedure and an association procedure between the second base station and the mobile station, and wherein the system command message further includes flow information to determine whether the data communication is performed via the service flow or another service flow.

* * * * *